United States Patent
Hammell et al.

(10) Patent No.: US 7,764,751 B1
(45) Date of Patent: Jul. 27, 2010

(54) FINE SYNCHRONIZATION OF A SIGNAL IN THE PRESENCE OF TIME SHIFT CAUSED BY DOPPLER ESTIMATION ERROR

(75) Inventors: Allan J. Hammell, Marion, IA (US); Carlos J. Chavez, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 972 days.

(21) Appl. No.: 11/528,881

(22) Filed: Sep. 28, 2006

(51) Int. Cl.
*H03D 1/00* (2006.01)
(52) U.S. Cl. .................................................. 375/343
(58) Field of Classification Search ................. 375/316, 375/340, 343, 354, 363, 365, 366, 368, 371, 375/372; 342/73, 89, 98, 99
See application file for complete search history.

(56) References Cited

U.S. PATENT DOCUMENTS

| | | | |
|---|---|---|---|
| 5,857,155 A | 1/1999 | Hill et al. | |
| 5,896,304 A * | 4/1999 | Tiemann et al. | .......... 708/5 |
| 6,301,311 B1 | 10/2001 | Sheba | |
| 6,459,407 B1 * | 10/2002 | Akopian et al. | ..... 342/357.12 |
| 6,748,030 B2 | 6/2004 | Myers | |
| 7,444,128 B1 * | 10/2008 | Nelson | ............. 455/226.1 |
| 2002/0172306 A1 * | 11/2002 | Abraham et al. | ............. 375/343 |

* cited by examiner

Primary Examiner—David C. Payne
Assistant Examiner—Vineeta S Panwalkar
(74) Attorney, Agent, or Firm—Matthew J. Evans; Daniel M. Barbieri

(57) ABSTRACT

A radio frequency receiver includes a receiving circuit for receiving and decoding an incoming radio frequency signal including a correlation signal. The receiver also includes a timing estimation circuit. The timing estimation circuit comprises a signal buffer receiving a plurality of correlation signal segments, and a first peak detection and Doppler estimation circuit for determining a first timing of a first segment and the associated first Doppler shift. The timing estimation circuit also comprises a memory coupled to the signal buffer, the memory receiving a plurality of segment correlation metrics, and a second peak detection and Doppler estimation circuit for determining a second timing of a second segment and the associated second Doppler shift. Further included in the timing circuit is a final correlation circuit for determining a final timing estimate based on the first Doppler shift, the second Doppler shift, and the first timing estimate and based on the correlation metrics of at least some of the plurality of correlation segments.

21 Claims, 5 Drawing Sheets

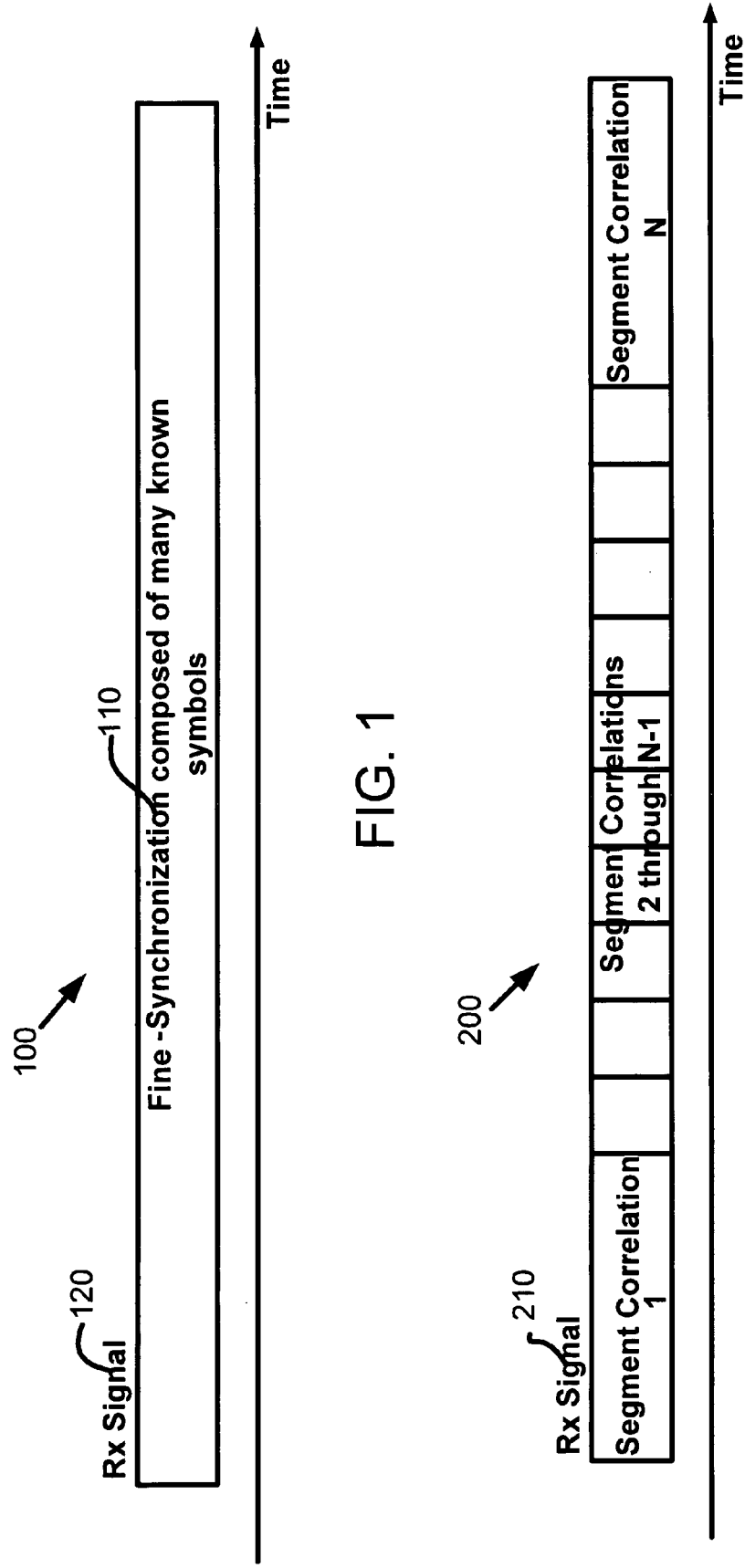

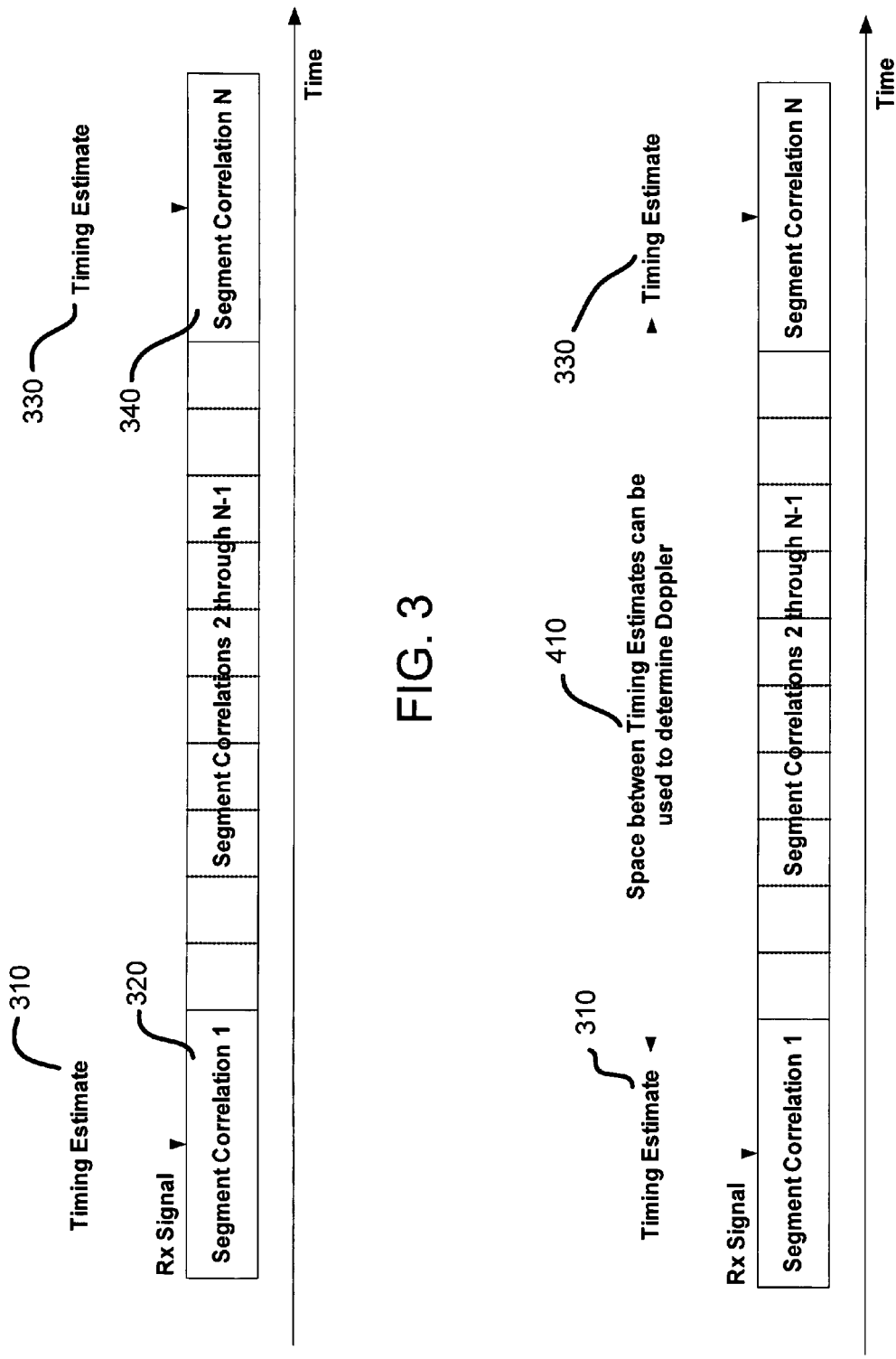

FINE SYNCHRONIZATION OF A SIGNAL IN THE PRESENCE OF TIME SHIFT CAUSED BY DOPPLER ESTIMATION ERROR

BACKGROUND

The invention generally relates to fine synchronization of timing for a receiving system especially for systems operating at very low signal-to-noise ratios with the potential for Doppler shift. Such receiving systems may be used in applications including, but not limited to, spread-spectrum communication systems and radar applications.

Such systems may require a receiver to operate at extremely low signal-to-noise ratio (SNR), often, for example, well below negative 20 dB.

Often critical to such operation is the capability of a receiver to synchronize the timing of the signal and accurately measure the shift in timing of the signal caused by Doppler. At an extremely low signal-to-noise ratio, many known symbols must be received to establish very fine timing. The larger the number of known symbols that are received, the greater the amount of drift caused by error in the initial Doppler measurement.

Accordingly, there is a need for a method of fine synchronization of timing for a receiving system especially in contexts in which very low signal to noise ratios are used. There is also a need for a method for performing a fine synchronization of timing, including Doppler shift, while efficiently maintaining throughput by limiting the number of required known symbols.

The techniques herein below extend to those embodiments which fall within the scope of the appended claims, regardless of whether they accomplish one or more of the above-mentioned needs.

SUMMARY

What is provided is a radio frequency receiver. The receiver includes a receiving circuit for receiving and decoding an incoming radio frequency signal including a correlation signal. The receiver also includes a timing estimation circuit. The timing circuit comprises a signal buffer receiving a plurality of correlation signal segments; a first peak detection and Doppler estimation circuit for determining a first timing of a first segment and the associated first Doppler shift; a memory coupled to the signal buffer, the memory receiving a plurality of segment correlation metrics; a second peak detection and Doppler estimation circuit for determining a second timing of a second segment and the associated second Doppler shift; and a final correlation circuit for determining a final timing estimate based on the first Doppler shift, the second Doppler shift, and the first timing estimate and based on the correlation metrics of at least some of the plurality of correlation segments.

What is also provided is a method of determining a timing estimate and Doppler shift estimate for a received radio frequency signal. The method includes receiving and decoding an incoming radio frequency signal including a correlation signal and segmenting the correlation signal into segments in a signal buffer. The method also includes determining a first timing of a first segment and the associated first Doppler shift by a first peak detection and Doppler estimation circuit and determining a plurality of correlation metrics based on the first timing estimate and the first Doppler shift. Further, the method includes storing the plurality of correlation metrics in a memory. Further still, the method includes determining a second timing of a second segment and the associated second Doppler shift by a second peak detection and Doppler estimation circuit. Yet further still, the method includes determining a final timing estimate based on the first Doppler shift, the second Doppler shift, and the first timing estimate by a final correlation circuit and based on at least some of the plurality of correlation segments.

Further, what is provided is a system for determining a timing estimate and Doppler shift estimate for a received radio frequency signal. The system includes a means for receiving and decoding an incoming radio frequency signal including a correlation signal. The system also includes a means for segmenting the correlation signal into segments in a signal buffer. Further, the system includes a means for determining a first timing of a first segment and the associated first Doppler shift by a first peak detection and Doppler estimation circuit. Further still, the system includes a means for determining a plurality of correlation metrics based on the first timing estimate and the first Doppler shift and a means for storing the plurality of correlation metrics in a memory. Yet further still, the system includes a means for determining a second timing of a second segment and the associated second Doppler shift by a second peak detection and Doppler estimation circuit. Yet still further, the system includes a means for determining a final timing estimate based on the first Doppler shift, the second Doppler shift, and the first timing estimate by a final correlation circuit and based on at least some of the plurality of correlation segments.

Alternative exemplary embodiments relate to other features and combinations of features as may be generally recited in the claims.

BRIEF DESCRIPTION OF THE DRAWINGS

A better understanding of the features and advantages of the present invention will be obtained by reference to the following detailed description that sets forth illustrative embodiments by way of example only, in which the principles of the invention are utilized, and the accompanying drawings, of which:

FIG. 1 is an exemplary diagram of a general view of a signal's fine synchronization.

FIG. 2 is an exemplary diagram of the allocation of known symbols.

FIG. 3 is an exemplary diagram of timing that is gathered at multiple points in the fine synchronization.

FIG. 4 is an exemplary diagram of a Doppler estimate that is generated from the two timing estimates.

DETAILED DESCRIPTION

Figure 5:
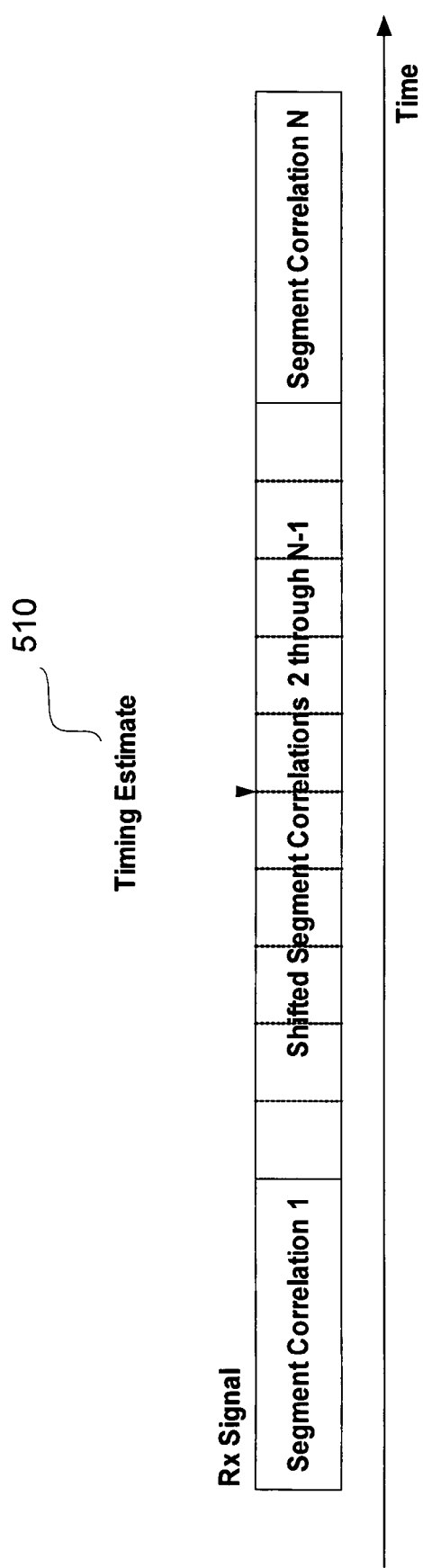
FIG. 5 is an exemplary diagram of the intermediate symbols having been shifted appropriately and a more accurate timing synchronization is performed.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

The majority of chip rate error observed by a receiver in a tactical environment is a result of Doppler frequency shift. The error $R_e$ in chip rate caused by Doppler shift is a function of relative velocity v, nominal (transmitted) chip rate $R_c$, and the speed of light c, where $$R_e = \pm v R_c / c.$$

For a system that must be able to operate at extremely low SNR, the known sequence of chips used for signal acquisition must be very long in order to produce reasonable probabilities of detection and false alarm. As a result, the chip rate error caused by Doppler shift can result in multiple chip times of time error over the length of the known sequence. Thus, the receiver must perform signal acquisition that searches over a range of Doppler shifts as well as over a range of arrival times. Furthermore, the signal acquisition function must provide an estimate of the chip rate Doppler shift so that it can be compensated for when demodulating the signal. The error of this estimate will result in a need for further synchronization.

Referring now to FIG. 1, known symbols need to be received to synchronize the signal's timing. The greater the number of symbols, the better the synchronization will be statistically. FIG. 1 depicts an exemplary fine-synchronization 100 in which many known symbols 110 are provided in the received signal 120. The lower the SNR, the more symbols that are needed to accurately synchronize. If there exists an error in the measurement of Doppler shift from previous synchronization (or acquisition), the synchronization process is limited in its ability to get a better timing estimate by synchronizing over more symbols because of the compression (or expansion) that is caused by Doppler shift.

Referring now to FIG. 2, an exemplary diagram of a stream of known symbols 200 in a received signal 210 is depicted. In the diagram depicted, the received signal may be broken up into a plurality (N) of segments. This method breaks up the synchronization into segments to reduce the effect of a poor Doppler measurement. There are two segments that are used for timing estimation one is located at the start of the signal and one located at the end of the fine synchronization. The size of the intermediate segments may be determined by hardware limitations or other design considerations. In an exemplary embodiment, these intermediate correlations (segments 2 through N-1) are performed after the other two (segments 1 and N).

In General, the most appropriate timing estimation for any correlation may be at the center of the segment of known symbols. Referring now to FIG. 3, an exemplary diagram depicts that timing may be estimated from the first and last segment correlation. For example, a first timing estimate 310 is accomplished using Segment Correlation 1 320. A second timing estimate 330 is accomplished using Segment Correlation N 340. The two timing estimates 310 and 330 should preferably be spaced as far as possible in the given amount of known symbols but not so far as to cause loss-of-lock. Although this may be the preferred methodology, other methodologies may be used without departing from the scope of the invention.

Referring now to FIG. 4, based on the two timing estimations 310 and 330, the Doppler measurement 410 may be calculated. The accuracy of this measurement may be the difference of the two timing errors divided by the time between them. The Doppler measurement has the ability to be much more accurate than either of the timing estimates because the overall error is divided by a length of time that can be very long.

Now that the Doppler measurement is more accurate than it was when the segments were being received, the received symbols can be adjusted into a more accurate location in time based on the new Doppler measurement and the two timing estimates (See FIG. 5). Timing estimate 510 is obtained by using the information in all the segments after segments 2 through N-1 have been adjusted into a more accurate position in time.

Because the effect of Doppler shift has been corrected before correlations 2 through N-1, the synchronization process can take advantage of the greater number of symbols, without having Doppler be a limiting factor in its accuracy. Using all the correlations the process can better estimate timing. Now the process has a good measurement of Doppler shift and a good measurement of timing. Using this information it can more accurately know the timing for the rest of the signal. Depending on the length of the signal a tracking loop may be needed because there will always exist some error in the Doppler estimate. Such a tracking loop could use a similar method to measure the Doppler by either measuring back to the overall timing estimation of this fine synchronization or by measuring back a certain number of tracking loop synchronizations. Although this may be the preferred methodology for a subsequent tracking loop, other methodologies may be used without departing from the scope of the invention.

Figure 6:
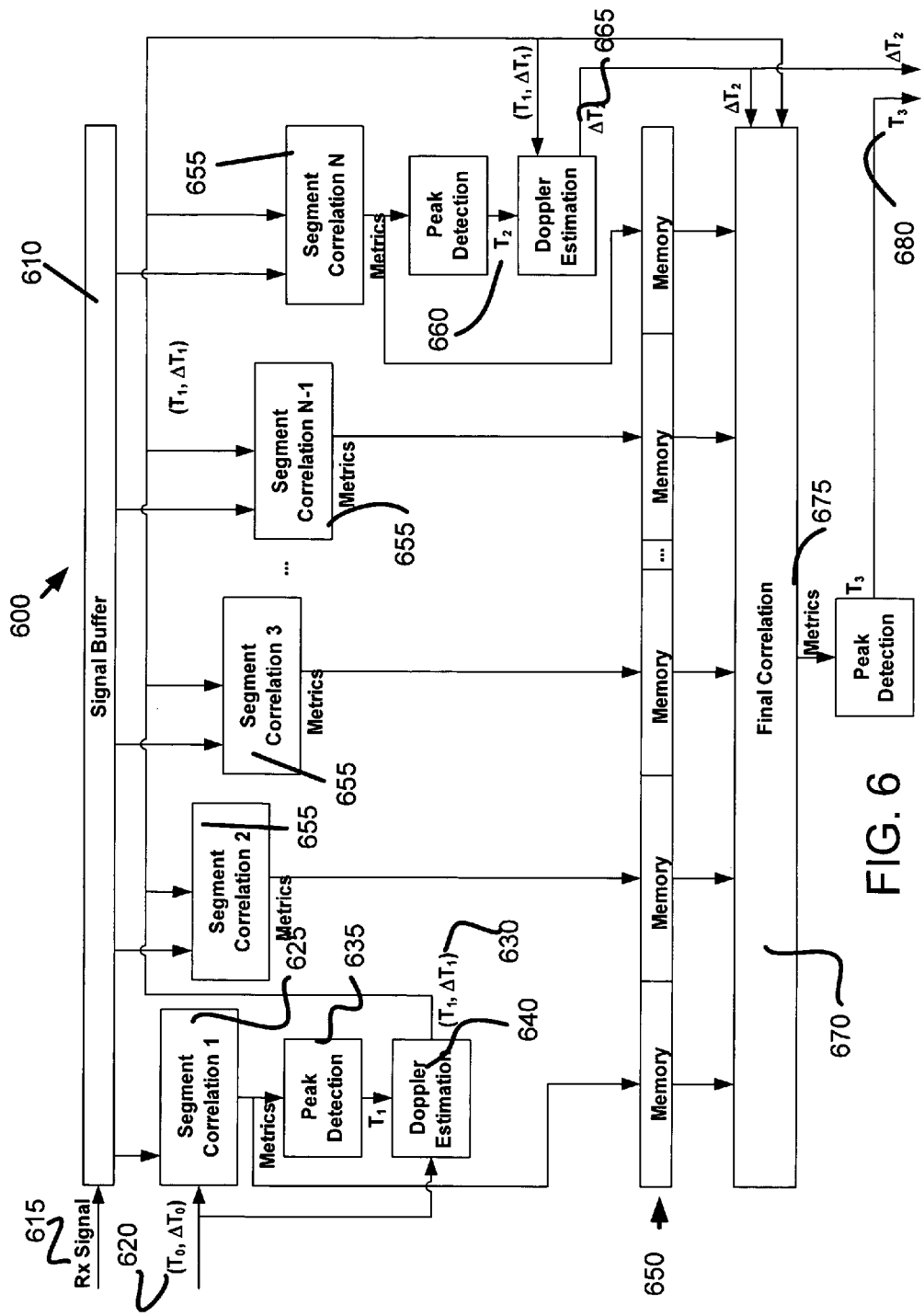
FIG. 6 is an exemplary block diagram of an efficient implementation in accordance with at least one exemplary embodiment.

Referring now to FIG. 6, an exemplary implementation 600 of the system and method of fine synchronization discussed is depicted. At the very low SNR modes of operation, the length of the sequence of known symbols may be millions of chips. This will lead to issues with hardware implementation because of inability to store and post-process this information. It is possible to yield much of the gain without having to store every symbol and post-process everything By correlating segments 2 through N-1 as they are received and storing their correlation metrics and then shifting their metrics after an improved Doppler estimation is obtained, an accurate estimation of timing can be obtained without needing to store as large amounts of information as would be needed if every symbol were stored and then post-processed. The smaller the length of the intermediate segments, the more amount of compression (or expansion) the synchronization could handle, up to the point where the compression is so great that segment N can no longer form a good time estimation.

FIG. 6 depicts an exemplary implementation of the fine synchronization method. A signal buffer 610 receives the incoming signal 615. An initial timing and a Doppler estimate (T0 and ΔT0, respectfully) 620 are determined from an acquisition function. A correlation is performed on the first segment 625 so that better timing and Doppler estimates (T1 and ΔT1, respectfully) 630 can be computed (in "Peak Detection" 635 and "Doppler Estimation" 640). The correlation metrics from segment correlation 1 are stored into memory 650 for later use. Each subsequent segment correlation 655 uses the timing and Doppler estimates T1 and ΔT1 630 that were based on the first segment correlation. The metrics from all of these segment correlations are stored into memory 650 for later use. Because the system has estimates of timing and Doppler shift rate, only a small number of metrics for each segment correlation, corresponding to an appropriate period of time, will need to be stored instead of all the metrics over the entire synchronization period. The final segment correlation metrics are used to get a new timing estimate (T2) 660.

Using this timing estimate 660 and the previous timing estimate 630 a new Doppler estimate (ΔT2) 665 can be computed. Using ΔT1, ΔT2, and T1 a final correlator 670 can adjust the metrics that were computed from all of the segment correlators and produce the metrics 675 for the entire synchronization period which will be used to compute the overall timing (T3) 680. The method then outputs the timing estimate T3 and the Doppler estimate ΔT2.

Figure 7:
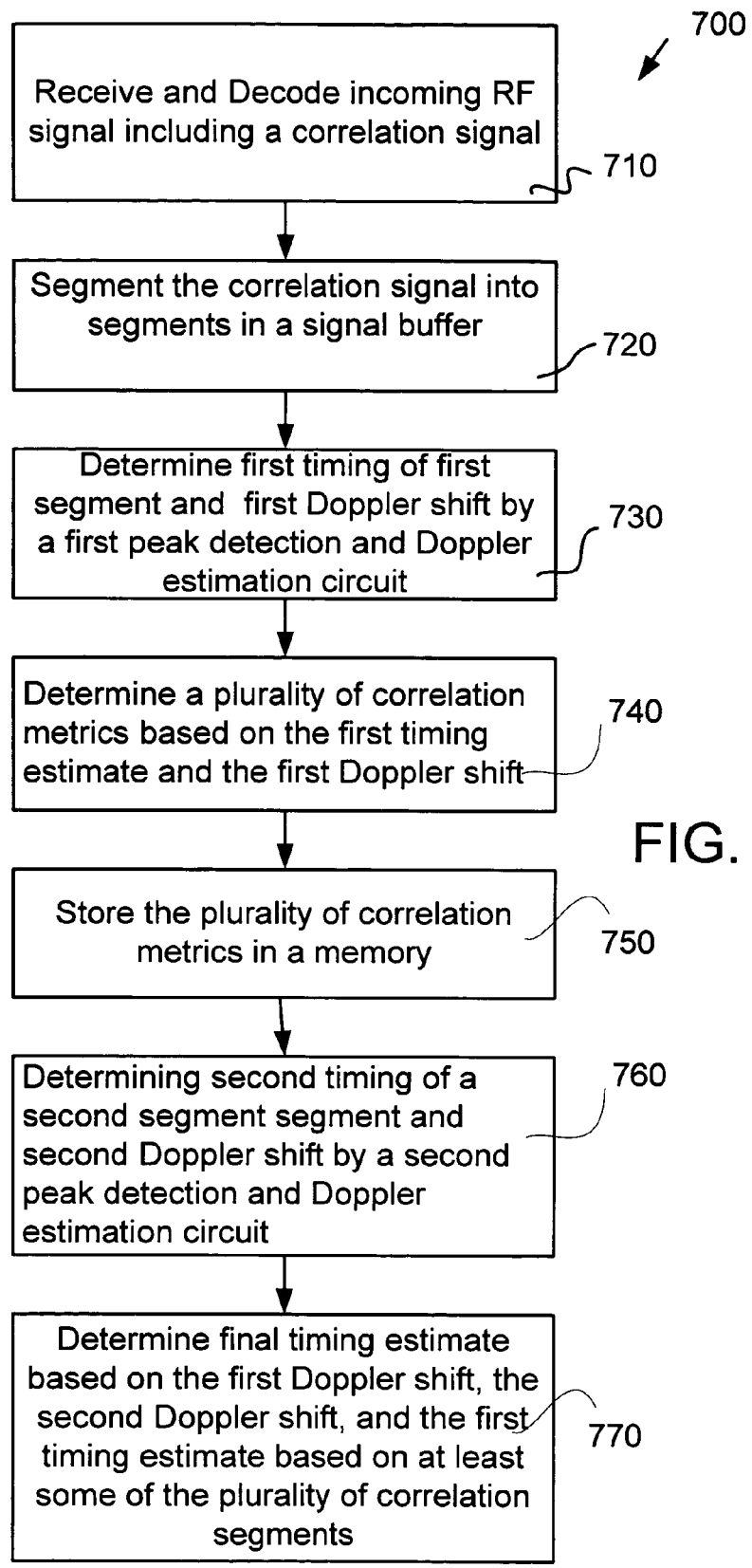
FIG. 7 is an exemplary process diagram of a synchronization method in accordance with at least one exemplary embodiment.

Referring now to FIG. 7, a process 700 for determining a timing estimate and Doppler shift estimate for a received radio frequency signal is depicted. Method 700 includes receiving and decoding an incoming radio frequency signal (process 710). The RF signal includes a correlation signal. Once the signal is received or in the process of being received, the correlation signal is segmented within a signal buffer (process 720). A first estimation of timing and Doppler rate, based on the first segment, is determined by a first peak detection and Doppler estimation circuit (process 730). A plurality of correlation metrics based on the first timing estimate and the first Doppler shift is then determined (process 740). The plurality of correlation metrics are stored in a memory (process 750). Next, a second estimation of timing and Doppler rate, based on a different segment, is determined by a second peak detection and Doppler estimation circuit (process 760). A final timing estimate based on the first Doppler shift, the second Doppler shift, and the first timing estimate are determined by a final correlation circuit and based on at least some of the plurality of correlation segments (process 770).

While the detailed drawings, specific examples, and particular formulations given described exemplary embodiments, they serve the purpose of illustration only. It should be understood that various alternatives to the embodiments of the invention described maybe employed in practicing the invention. It is intended that the following claims define the scope of the invention and that structures within the scope of these claims and their equivalents be covered thereby. The hardware and software configurations shown and described may differ depending on the chosen performance characteristics and physical characteristics of the computing and analysis devices. For example, the type of computing device, communications bus, or processor used may differ. The systems shown and described are not limited to the precise details and conditions disclosed. Method steps provided may not be limited to the order in which they are listed but may be ordered any way as to carry out the inventive process without departing from the scope of the invention. Furthermore, other substitutions, modifications, changes and omissions may be made in the design, operating conditions and arrangements of the exemplary embodiments without departing from the scope of the invention as expressed in the appended claims.

What is claimed is:

1. A radio frequency receiver, comprising:
    a receiving circuit for receiving and decoding an incoming radio frequency signal including a correlation signal;
    a timing estimation circuit, the timing circuit comprising:
        a signal buffer receiving a plurality of correlation signal segments;
        a first peak detection and Doppler estimation circuit for determining a first timing of a first segment and the associated first Doppler shift;
        a memory coupled to the signal buffer, the memory receiving a plurality of segment correlation metrics;
        a second peak detection and Doppler estimation circuit for determining a second timing of a second segment and the associated second Doppler shift; and
        a final correlation circuit for determining a final timing estimate based on the first Doppler shift, the second Doppler shift, and the first timing estimate and based on the correlation metrics of at least some of the plurality of correlation segments.

2. The receiver of claim 1, wherein the receiving circuit is part of a communication system unit.

3. The receiver of claim 1, wherein the receiving circuit is part of an ad hoc network system unit.

4. The receiver of claim 1, wherein the timing estimation circuit supports a low SNR mode of operation.

5. The receiver of claim 1, wherein the receiver is capable of operating at signal to noise ratios below negative 20 dB.

6. The receiver of claim 1, wherein each segment comprises more than one known symbol.

7. The receiver of claim 1, wherein the receiver is part of a software defined radio.

8. A method of determining a timing estimate and Doppler shift estimate for a received radio frequency signal, comprising:
    receiving and decoding an incoming radio frequency signal including a correlation signal;
    segmenting the correlation signal into segments in a signal buffer;
    determining a first timing of a first segment and the associated first Doppler shift by a first peak detection and Doppler estimation circuit;
    determining a plurality of correlation metrics based on the first timing estimate and the first Doppler shift;
    storing the plurality of correlation metrics in a memory;
    determining a second timing of a second segment segment and the associated second Doppler shift by a second peak detection and Doppler estimation circuit; and
    determining a final timing estimate based on the first Doppler shift, the second Doppler shift, and the first timing estimate by a final correlation circuit and based on at least some of the plurality of correlation segments.

9. The method of claim 8, wherein the receiving is carried out by a communication system unit.

10. The method of claim 8, wherein the receiving is carried out by an ad hoc network system unit.

11. The method of claim 8, wherein the final timing estimation supports a low SNR mode of operation.

12. The method of claim 8, wherein the final timing estimation supports operating at signal to noise ratios below negative 20 dB.

13. The method of claim 8, wherein each segment comprises more than one known symbol.

14. The method of claim 8, wherein the method is carried out by a software defined radio.

15. A system for determining a timing estimate and Doppler shift estimate for a received radio frequency signal, comprising:
    a means for receiving and decoding an incoming radio frequency signal including a correlation signal;
    a means for segmenting the correlation signal into segments in a signal buffer;
    a means for determining a first timing of a first segment and the associated first Doppler shift by a first peak detection and Doppler estimation circuit;
    a means for determining a plurality of correlation metrics based on the first timing estimate and the first Doppler shift
    a means for storing the plurality of correlation metrics in a memory;

a means for determining a second timing of a second segment and the associated second Doppler shift by a second peak detection and Doppler estimation circuit; and a means for determining a final timing estimate based on the first Doppler shift, the second Doppler shift, and the first timing estimate by a final correlation circuit and based on at least some of the plurality of correlation segments.

16. The system of claim 15, wherein the means for receiving is part of a communication system unit.

17. The system of claim 15, wherein the means for receiving is part of an ad hoc network system unit.

18. The system of claim 15, wherein the system supports a low SNR mode of operation.

19. The system of claim 15, wherein the system is capable of operating at signal to noise ratios below negative 20 dB.

20. The system of claim 15, wherein each segment comprises more than one known symbol.

21. The system of claim 15, wherein the system is part of a software defined radio.

* * * * *